United States Patent
Helvenston et al.

(10) Patent No.: US 9,347,585 B2
(45) Date of Patent: May 24, 2016

(54) DUAL SEAL FIRE SAFE STEM PACKING ORIENTATION

(71) Applicant: GE Oil & Gas Pressure Control LP, Houston, TX (US)

(72) Inventors: Andrew Browne Helvenston, Houston, TX (US); Robert Kevin Law, Houston, TX (US); Mark Anthony Viator, Houston, TX (US); Keith Adams, Houston, TX (US); Rolando Farinas, Houston, TX (US)

(73) Assignee: GE Oil & Gas Pressure Control LP, Houston, TX (US)

( * ) Notice: Subject to any disclaimer, the term of this patent is extended or adjusted under 35 U.S.C. 154(b) by 198 days.

(21) Appl. No.: 14/090,026

(22) Filed: Nov. 26, 2013

(65) Prior Publication Data

US 2015/0144823 A1 May 28, 2015

(51) Int. Cl.
*F16K 3/02* (2006.01)
*F16K 41/04* (2006.01)

(52) U.S. Cl.
CPC .............. *F16K 41/04* (2013.01); *F16K 3/0236* (2013.01); *Y10T 137/6069* (2015.04)

(58) Field of Classification Search
CPC ......... F16K 41/04; F16K 41/02; F16K 3/243; F16K 3/0227; F16K 3/0236; F16K 41/08; F16K 41/083; F16K 41/086; Y10T 137/6069; F16J 15/18; F16J 15/188; F16J 15/24; F16J 15/26; F16J 15/28
USPC ....................................................... 251/214
See application file for complete search history.

(56) References Cited

U.S. PATENT DOCUMENTS

| 3,257,095 | A | | 6/1966 | Siver |
| 3,958,592 | A | | 5/1976 | Wells et al. |
| 4,262,690 | A | | 4/1981 | Binegar |
| 4,577,873 | A | | 3/1986 | Baumann |
| 5,078,175 | A | | 1/1992 | Martin et al. |
| 5,190,264 | A | * | 3/1993 | Boger ........................... 251/214 |

(Continued)

FOREIGN PATENT DOCUMENTS

| CN | 201925592 U | 8/2011 |
| FR | 2260048 A1 | 8/1975 |
| JP | 6081370 U | 6/1985 |

OTHER PUBLICATIONS

International Search Report and Written Opinion issued in connection with corresponding PCT Application No. PCT/US2014/064195 on Feb. 11, 2015.

*Primary Examiner* — Matthew W Jellett
(74) *Attorney, Agent, or Firm* — Bracewell LLP

(57) ABSTRACT

A valve with a packing assembly includes a valve body assembly with a bore, a valve member moveable between an open position and a closed position, and a valve stem coupled to the valve member. A first stem packing circumscribes a portion of the valve stem, and is located in an upper bore portion of the bore. A first packing retainer has a collar that limits axial movement of the first stem packing, and also has a first retainer body defining an inner cavity. A second stem packing circumscribes a portion of the valve stem and is located in the inner cavity of the first packing retainer. A second packing retainer has a neck compressingly engaging the second stem packing, and a retainer shoulder that engages the first packing retainer. A retaining assembly is coupled with the valve body assembly for applying axial force to the second packing retainer.

22 Claims, 3 Drawing Sheets

(56) References Cited

U.S. PATENT DOCUMENTS

| | | | |
|---|---|---|---|
| 5,238,252 A * | 8/1993 | Stewen et al. | 277/511 |
| 5,263,682 A * | 11/1993 | Covert et al. | 251/214 |
| 5,375,812 A | 12/1994 | Kent | |
| 6,202,668 B1 * | 3/2001 | Maki | 137/72 |
| 6,997,437 B2 * | 2/2006 | Mitten | 251/214 |
| 2005/0082766 A1 * | 4/2005 | Lovell et al. | 277/510 |
| 2013/0161553 A1 * | 6/2013 | Hunter | 251/366 |

\* cited by examiner

DUAL SEAL FIRE SAFE STEM PACKING ORIENTATION

BACKGROUND

1. Field of the Disclosure

The present disclosure relates in general to valve bonnets and more particularly, to valve bonnet seals for use with oil, gas and other fluids.

2. Description of Prior Art

A gate valve has a body with a central chamber that is intersected by a flow passage. A gala moves within the chamber between the open and closed positions. The gate has a hole through it that aligns with the flow passage while in the open position. A stem extends into engagement with the gate for moving the gate between open and closed positions. In one type, the stem has a first end that extends through a bonnet of the valve body assembly and a second end that extends into rotatable engagement with a threaded nut or sleeve secured to the gate. Rotating the stem causes the gate to move linearly. In another type, the stem doss not rotate. Instead a threaded nut or sleeve mounted in the bonnet engages the stem, and when rotated, causes the stem to move linearly.

In gate valves, and in other valves with stems that rotate or move linearly, a stem packing is typically located in the bonnet and engages the stem to seal pressure within the chamber. Valves which are designed to work within a defined fire envelope must be capable of providing both high integrity normal operation well control and emergency pressure containment in the event of a fire. A single metal to metal seal that can meet both of these demands can require special coatings and can be very expensive and technically difficult to design and implement, especially on rotary valves. In addition, a single seal does not provide redundancy in the case of the failure of the seal.

SUMMARY OF THE DISCLOSURE

Embodiments of the current disclosure provide a system and method relating to a stem packing with seal redundancy that is capable of providing both a high integrity seal during normal operation well control and also emergency pressure containment in the event of a fire. Embodiments of the current disclosure have robust capabilities for both normal operations and for emergency pressure containment in the event of a fire without significantly increasing the overall height of the valve body assembly and without significantly increasing the cost of the stem packing components, compared to a stem packing that is only capable of functioning during normal operations.

In an embodiment of this disclosure, a valve having a packing assembly includes a valve body assembly defining a flow passage and a body cavity perpendicular to the flow passage. The valve body assembly further defines a bore extending from an exterior of the valve body assembly into the body cavity. The bore has an upper bore portion with an enlarged diameter defined by an inner surface of the bore. A valve member is moveable between an open position and a closed position, the valve member blocking the flow passage in the closed position, and allowing flow through the flow passage in the open position. A valve stem is coupled to the valve member, the valve stem extending from the body cavity to an exterior of the valve body assembly through the bore for moving the valve member from the closed position to the open position. The valve stem has an axis. A first stem packing circumscribes a portion of the valve stem, and is located in the upper bore portion. A first packing retainer has a collar that limits axial movement of the first stem packing, and also has a first retainer body defining an inner cavity. A second stem packing circumscribes a portion of the valve stem and is located in the inner cavity of the first packing retainer. A second packing retainer has a neck that compressingly engages the second stem packing, and also has a retainer shoulder that engages the first packing retainer. A retaining assembly is coupled with the valve body assembly for applying axial force to the second packing retainer.

In certain embodiments, the retaining assembly includes a first nut coupled with the valve body assembly and is in engagement with the second packing retainer. A second nut is coupled with the valve body and at least one shim is located between the first nut and the second nut to position the second nut a selected distance from the body cavity for limiting a down stroke of the valve stem. Alternatively, the second packing retainer can have threads on an outer surface that engage threads on an inner surface of the bore of the valve body assembly. In such an embodiment, the retaining assembly would include a second nut coupled with the valve body assembly.

In other embodiments, the first packing retainer can include a tapered seal portion located adjacent to the collar, the tapered seal portion being radially deflectable and having a sloped seal surface. The valve body assembly can have a mating seal surface so that the tapered seal portion defects and forms a fluid seal between the first packing retainer and the valve body assembly when the first packing retainer is pushed to engage the sloped seal surface of the first packing retainer with the mating seal surface of the valve body assembly.

In yet other embodiments, the valve body assembly can have a bonnet shoulder and the first stem packing is located between an end surface of the collar and the bonnet shoulder. The height of the first stem packing can be less than the distance between the distance between bonnet shoulder and the end surface of the collar allowing limited axial movement of the first stem packing relative to the valve body assembly. The second packing retainer can have a first circumferential groove on an outer surface and a second circumferential groove on an inner surface. A first sealing member can be located in the first circumferential groove to create a fluid seal between the outer surface of the second packing retainer and the valve body assembly. A second sealing member can be located in the second circumferential groove to create a fluid seal between the inner surface of the second packing retainer and the valve stem. The second sealing member can be graphite.

In another embodiment of the current disclosure, a packing assembly for sealing an annular space between a valve stem with an axis and a valve body assembly includes a lower packing retainer having a collar with a lower end surface, and a lower retainer body defining an inner cavity with a bottom surface. The collar has a smaller outer diameter than the lower retainer body. A lower stem packing floats between the lower end surface of the collar of the lower packing retainer and the valve body assembly. An upper packing retainer has a downward protruding neck having a reduced outer diameter. The upper packing retainer also has a downward facing retainer shoulder that engages an upper end of the lower packing retainer. A fire resistant stem packing is located in the inner cavity of the lower packing retainer. The fire resistant stem packing is compressed between the bottom surface of the inner cavity and the downward protruding neck of the upper packing retainer. A retaining assembly is selectively coupled to the valve body assembly for applying axial force to the upper packing retainer.

In certain embodiments, the retaining assembly can include a lower nut in engagement with the second packing retainer and at least one shim for adjusting the overall height of the packing assembly. An upper nut can retain the at least one shim and limit the stroke of the valve stem. The lower nut can have a circumferential wear ring on an inner surface to selectively center the valve stem within the packing assembly.

In other embodiments, the lower packing retainer can include a radially deflectable tapered seal portion located adjacent to the collar for selectively creating a metal to metal seal between the lower packing retainer and the valve body assembly. A spring member can be located within the inner cavity for applying axial compressive force on the fire resistant stem packing. A first circumferential sealing member can selectively create a fluid seal between an outer surface of the upper packing retainer and the valve body assembly, and a second circumferential sealing member can selectively create a fluid seal between an inner surface of the upper packing retainer and the valve stem.

In another alternative embodiment of the current application, a valve having a packing assembly includes a valve body assembly defining a flow passage and a body cavity perpendicular to the flow passage. The valve body assembly further defines a bore extending from an exterior of the valve body assembly into the body cavity, the valve body assembly having an upward facing seal surface. A valve member is moveable between an open position and a closed position, the valve member blocking the flow passage in the closed position, and allowing flow through the flow passage in the open position. A valve stem coupled to the valve member, the valve stem having an axis and extending from the body cavity to an exterior of the valve body assembly through the bore for moving the valve member from the closed position to the open position. An upper bore portion is defined by an inner surface of the bore. A floating lower stem packing circumscribes a portion of the valve stem, and is located in the upper bore portion. A lower packing retainer has a collar that limits axial movement of the lower stem packing. The lower packing retainer also has a lower retainer body defining an inner cavity and a tapered seal portion located adjacent to the collar, the tapered seal portion having a downward facing seal surface. A compressed fire resistant stem packing circumscribes a portion of the valve stem and is located in the inner cavity of the lower packing retainer. An upper packing retainer with a downward protruding neck engages the fire resistant stem packing. The upper packing retainer also has a downward racing retainer shoulder that engages with the lower packing retainer. A retaining assembly is coupled with the valve body assembly for applying axial force to the upper packing retainer. The tapered seal portion has a downward facing circumferential recess and deflects to form a fluid seal between the lower packing retainer and the valve body assembly when the lower packing retainer is pushed downward to engage the downward facing seal surface of the lower packing retainer with the upward facing seal surface of the valve body assembly.

In certain embodiments, a valve actuator can be co-axially aligned with the valve stem and the retaining assembly can have a lower nut coupled with the valve body assembly and engaging the upper packing retainer. An upper nut can be coupled with the valve body assembly and at least one shim can be located between the lower nut and the upper nut. The shims can be sized to limit the stroke of the valve actuator.

In other embodiments, the lower stem packing can be formed of elastomeric materials and the fire resistant stem packing is graphite. The valve body assembly can have an upward facing bonnet shoulder and the lower stem packing can float between a lower end surface of the collar and the upward facing bonnet shoulder. The inner cavity can have a bottom surface and the fire resistant stem packing can be compressed between the bottom surface of the inner cavity and the downward protruding neck of the upper packing retainer.

In yet other embodiments, the retaining assembly can have a circumferential wear ring on an inner surface, the wear ring circumscribing a portion of the valve stem to center the valve stem within the packing assembly. A first circumferential sealing member can create a static fluid seal between the outer surface of the upper packing retainer and the bore, and a second circumferential sealing member can create a dynamic fluid seal between the inner surface of the upper packing retainer and the valve stem.

BRIEF DESCRIPTION OF DRAWINGS

Some of the features and benefits of the present disclosure having been stated, others will become apparent as the description proceeds when taken in conjunction with the accompanying drawings, in which.

Figure 1:
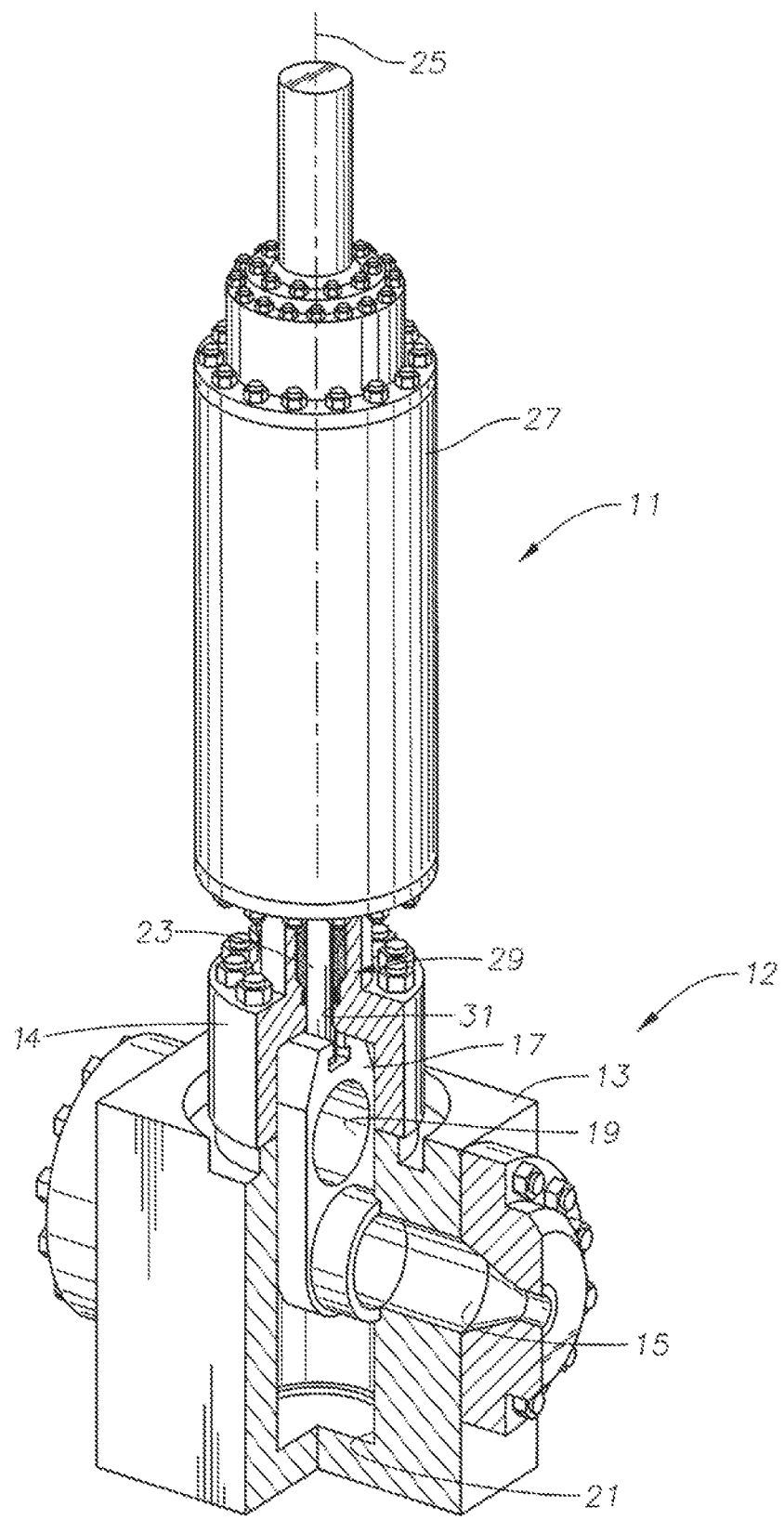
FIG. 1 is a partial sectional view of a gate valve with a packing assembly in accordance with an embodiment of the present disclosure.

While the disclosure will be described in connection with the preferred embodiments, it will be understood that it is not intended to limit the disclosure to that embodiment. On the contrary, it is intended to cover all alternatives, modifications, and equivalents, as may be included within the spirit and scope of the disclosure as defined by the appended claims.

DETAILED DESCRIPTION OF DISCLOSURE

The method and system of the present disclosure will now be described more fully hereinafter with reference to the accompanying drawings in which embodiments are shown. The method and system of the present disclosure may be in many different forms and should not be construed as limited to the illustrated embodiments set forth herein; rather, these embodiments are provided so that this disclosure will be thorough and complete, and will fully convey its scope to those skilled in the art. Like numbers refer to like elements throughout.

It is to be further understood that the scope of the present disclosure is not limited to the exact details of construction, operation, exact materials, or embodiments shown and described, as modifications and equivalents will be apparent to one skilled in the art. In the drawings and specification, there have been disclosed illustrative embodiments and, although specific terms are employed, they are used in a generic and descriptive sense only and not for the purpose of limitation.

Referring to FIG. 1, valve 11 is a gate valve with a valve body assembly 12. Valve body assembly 12 includes a bonnet 14 that is coupled to a valve body 13. A flow passage 15 extends transversely through valve body 13. Valve 11 has a valve member or gate 17 with a hole 19 therethrough. Gate 17 is shown in the closed position in FIG. 1. Valve 11 shown in FIG. 1 is a rising-stem type valve; however, embodiments of this disclosure can similarly be used on non-rising-stem type valves. When gate 17 is in the open position, hole 19 of gate 17 registers with flow passage 15 of valve body 13 thereby allowing flow through valve 11. When gate 17 is closed as shown, hole 19 no longer registers with flow passage 15, blocking flow of fluid through passage 15 and valve 11. Flow passage 15 intersects a body cavity 21 located in valve body 13. Body cavity 21 is generally perpendicular to flow passage 15.

Valve 11 also includes a valve stem 23 coupled to gate 17. Valve stem 23 has an axis 25 passing through a center of valve stem. 23. Valve stem 23 is linearly moveable without rotation along axis 25 to move gate 17 between the open and closed positions. In alternative embodiments, valve stem 23 extends into rotatable engagement with a threaded nut or sleeve (not shown) secured to gate 17 and rotating valve stem 23 will cause the gate to move linearly. In the illustrated embodiment, a valve actuator 27 couples to the bonnet 14 of valve body assembly 12, and circumscribes and is co-axially aligned with valve stem 23. As illustrated, valve 11 is hydraulically actuated. Valve 11 may be actuated by alternative means such as by an electrical or pneumatic actuator, using a remote operating system or by turning a hand wheel. Valve stem 23 extends from the body cavity 21 to the exterior of the valve body assembly 12 through the bore 31 of bonnet 14. A packing assembly 29 provides a fluid barrier or seal for valve stem 23 where valve stem 23 passes through bore 31 of bonnet 14.

A person skilled in the art will understand that valve 11, which is shown as a hydraulically actuated gate valve, is an exemplary valve. The disclosed embodiments contemplate and include any valve having a stem passing through a valve body to operate a valve member located within the body. Valve 11 can be, for example associated with a wellhead assembly that is disposed over a well. The wellhead assembly can include a wellhead housing, a production tree over the housing and flow lines connected to the tree or the wellhead assembly. The flow lines and wellhead assembly can include embodiments of valve 11 described herein. Valve 11 can also be used for regulating fluids, such as a fracturing fluid, that are designated for entry into the wellhead assembly. The wellhead assembly can be at surface or can be subsea.

Figure 2:
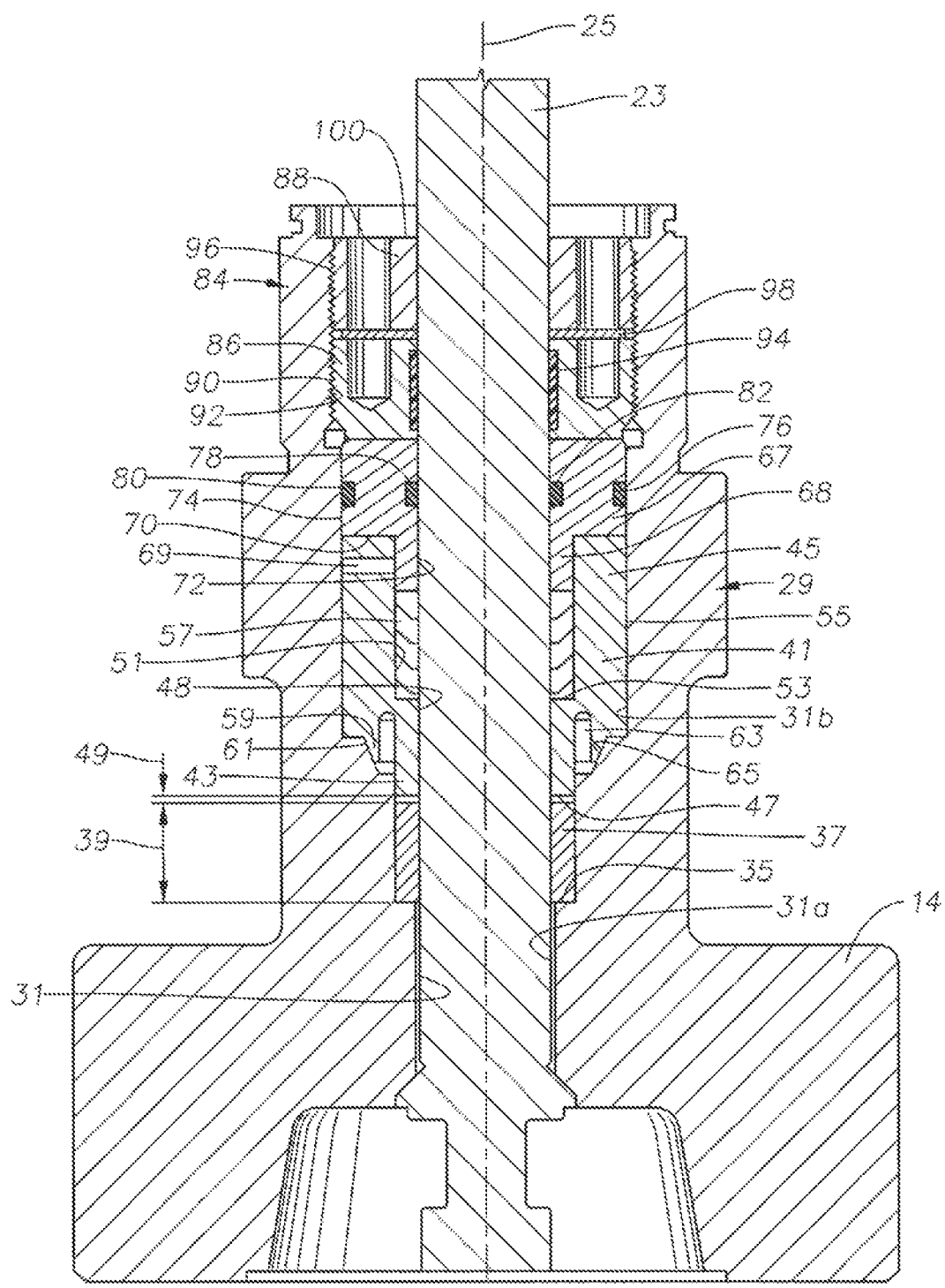
FIG. 2 is a sectional view of a bonnet of a valve body assembly with the packing assembly of FIG. 1 in accordance with an embodiment of the present disclosure.

Referring to FIG. 2, packing assembly 29 is shown in more detail. Bore 31 has a lower bore portion 31a of smaller diameter than upper bore portion 31b which has an enlarged diameter, creating an annular space between the valve stem 23 and the upper bore portion 31b. Bonnet 14 has an upward facing bonnet shoulder 35. A first or lower stem packing 37 is retained by the upward facing bonnet shoulder 35. Lower stem packing 37 is located within the upper bore portion 31b and circumscribes a portion of the valve stem 23. Lower stem packing 37 is a ring or tubular shaped member with a height 39. Lower stem packing 37 creates a fluid seal between the valve stem 23 and the bonnet 14. Lower stem packing 37 can be formed from any material suitable for use with a floating valve stem packing and can be, for example, an elastomeric stem packing.

The packing assembly 29 also includes a first or lower packing retainer 41. Lower packing retainer 41 is located in the tipper bore portion 31b, has a stepped ring or tubular shape and circumscribes a portion of the valve stem 23. Lower packing retainer 41 can be metal and has a collar 43 and a first retainer body such as lower retainer body 45. Collar 43 has a smaller outer diameter than lower retainer body 45 and extends downwards from lower retainer body 45. Collar 43 has a lower end surface 47 that provides an upper limit for axial movement of lower stem packing 37. An inner circumferential surface 48 of the collar 43 slidingly engages valve stem 23.

Height 39 of lower stem packing 37 is less than the distance between the upward facing bonnet shoulder 35 and the lower end surface 47 of collar 43. Therefore there is a gap 49 between the upper end of lower stem packing 37 and the lower end surface 47 of collar 43, or between the lower end of lower stem packing 37 and the upward facing bonnet shoulder 35, or some combination thereof. This gap 49 results in lower stem packing 37 being axially uncompressed and lower stem packing 37 is able to float between the upward facing bonnet shoulder 35 and the lower end surface 47 of collar 43.

The lower retainer body 45 extends upwards from collar 43 and is located radially outward from collar 43, with an inner circumferential surface defining an inner cavity 51. Inner cavity 51 is an upward facing annular recess adjacent to valve stem 23 with a bottom surface 53. An outer circumferential surface 55 of lower retainer body 45 is in non rotating contact with a part of upper bore portion 31b of bonnet 14 of valve body assembly 12. A second packing, such as fire safe or fire resistant stem packing 57 is located within inner cavity 51. Fire resistant stem packing 57 is a ring or tubular shaped member that circumscribes a portion of the valve stem 23. Fire resistant stem packing 57 creates a fluid seal between the valve stem 23 and the lower packing retainer 41. Fire resistant stem packing 57 can be formed of any material capable of continued seal performance under emergency fire conditions. Fire resistant stem packing 57 can be, for example, a compressed graphite packing.

Lower packing retainer 41 also has a nose or tapered seal portion 59. Tapered seal portion 59 is located adjacent to the collar 43 and has a sloped downward facing seal surface 61. Tapered seal portion 59 has a circumferential recess 63 which is elongated and opens downward and separates the tapered seal portion 59 from collar 43. Downward facing seal surface 61 mates with a sloped upward facing seal surface 65 of the bonnet 14 of the valve body assembly 12. Recess 63 allows the tapered seal portion 59 to deflect inward, applying an outward force to the upward facing seal surface 65 and creating a metal to metal fluid seal between the lower packing retainer 41 and the bonnet 14 when the downward facing seal surface 61 is pushed downward into engagement with the upward facing seal surface 65. This metal to metal seal prevents pressurized fluids from escaping between the lower packing retainer 41 and the bonnet 14 in an emergency fire condition.

Packing assembly 29 feather includes a second packing retainer, such as upper packing retainer 67. Upper packing retainer 67 is located in the upper bore portion 31b and is a ring or tubular shaped member that circumscribes a portion of the valve stem 23. Upper packing retainer 67 has a lower portion with a reduced outer diameter to define a downward protruding neck 68. The upper packing retainer 67 also has a downward facing retainer shoulder 70. An inner circumferential surface 72 of upper packing retainer 67 surrounds the valve stem 23 and an outer circumferential surface 74 of upper packing retainer 67 is surrounded by the bonnet 14 of valve body assembly 12, and is in contact with upper bore portion 31b. The upper packing retainer 67 can also include a side port 69. Side port 69 extends radially from the inner circumferential surface 72 to the outer circumferential surface 74. Side port 69 equalizes pressure across upper packing retainer 67 so that there is not a significant pressure differential between the inner circumferential surface 72 and the outer circumferential surface 74 of upper packing retainer 67.

The downward protruding neck 68 axially compresses fire resistant stem packing 57 between downward protruding neck 68 and the bottom surface 53 of inner cavity 51. Because the fire resistant stem packing 57 is located within inner cavity 51, it is radially restrained when compressed between the downward protruding neck 68 and the bottom surface 53 of inner cavity 51. The downward facing retainer shoulder 70 engages the lower retainer body 45 of lower packing retainer 41. The downward facing retainer shoulder 70 can apply downward force to lower packing retainer 41, causing lower packing retainer 41 to move downward to set the metal to metal seal between the lower packing retainer 41 and the bonnet 14 of valve body assembly 12 by engaging the downward facing seal surface 61 of lower packing retainer 41 with the upward facing seal surface 65 of bonnet 14.

The upper packing retainer 67 can have a first circumferential groove 76 on its outer surface 74 and a second circumferential groove 78 on its inner surface 72. A first sealing member 80 is located within the first circumferential groove 76 to form a static fluid seal between the outer surface 74 of the upper packing retainer 67 and the upper portion 31b of bore 31 of bonnet 14 of valve body assembly 12. A second sealing member 82 is located within the second circumferential groove 78 to form a dynamic fluid seal between the inner surface 72 of the upper packing retainer 67 and the valve stem 23. The first and second sealing members 80, 82 can be, for example, elastomeric o-rings and prevent any fluids from exiting the upper end of the valve body assembly 12 if the lower stem packing 37, lower packing retainer 41 or fire resistant stem packing 57 leak and allow fluid to reach the upper packing retainer 67.

The packing assembly 29 includes a retaining assembly 84. Retaining assembly 84 is located within the upper bore portion 31b, retains the upper packing retainer 67 within upper bore portion 31b of bore 31 and provides axial downward force to the upper packing retainer 67. Retaining assembly 84 is coupled with bonnet 14 of valve body assembly 12. In the embodiment of FIG. 2, retaining assembly 84 includes a first or lower nut 86 and a second or upper nut 88. Lower nut 86 is in engagement with upper packing retainer 67. Lower nut 86 has external threads 90 that mate with internal threads 92 of bore 31 of bonnet 14 to couple lower nut 86 to bonnet 14. As lower nut 86 is screwed into bonnet 14, lower nut 86 applies downward axial force on upper packing retainer 67, pushing upper packing retainer 67 downwards, which in turn causes both the downward protruding neck 68 of the upper packing retainer 67 to axially compress the fire resistant stem packing 57 and the downward facing retainer shoulder 70 to push the lower packing retainer 41 downward.

Lower nut 86 can include a circumferential wear ring 94. Wear ring 94 can be located within an inner circumferential groove of lower nut 86 and circumscribes and engages a portion of the valve stem 23. Wear ring 94 centers the valve stem 23 within packing assembly 29.

Retaining assembly 84 can include shims 98 located between lower nut 86 and an upper nut 88. Shims 98 correct for any misalignments generated by the cumulative tolerances of the valve actuator 27, valve body assembly 12, packing assembly 29, valve stem 23, and gate 17, in order for the hole 19 of gate 17 to correctly align with flow passage 15 of valve body 13 of valve body assembly 12. Shims 98 are selected to set to position the upper nut 88 a selected distance from the flow passage 15 for limiting a down stroke of the valve stem 23 and set the appropriate stroke of valve actuator 27. The upper end 100 of retaining assembly 84 will set the lower limit of the stroke of valve actuator 27. If larger shims 98 are selected, the overall height of packing assembly 29 will increase, and the lower limit of the stroke of valve actuator 27 will be higher. Conversely if smaller shims 98 are selected, the overall height of packing assembly 29 will decrease and the lower limit of the stroke of valve actuator 27 will be lower.

Upper nut 88 has external threads 96 that mate with internal threads 92 of bonnet 14 valve body assembly 12 to couple upper nut 88 to bonnet 14. Upper nut 88 is threaded into bonnet 14 to maintain the shims 98 in position. In this manner, shims 98 can be inserted, removed and replaced by simply removing upper nut 88 while lower nut 86 remains in place within bonnet 14. Therefore the shims 98 can be adjusted without having to onset and reset upper packing retainer 67, fire resistant stem packing 57, and lower packing retainer 41. As shown, lower nut 86 and upper nut 88 have vertical tool holes for aiding in screwing the nuts 86, 88 into the bonnet 14. In other embodiments, nuts 86, 88 may have alternatively shaped top or surface profiles for accepting a tool to screw nuts 86, 88 into bonnet 14.

Figure 3:
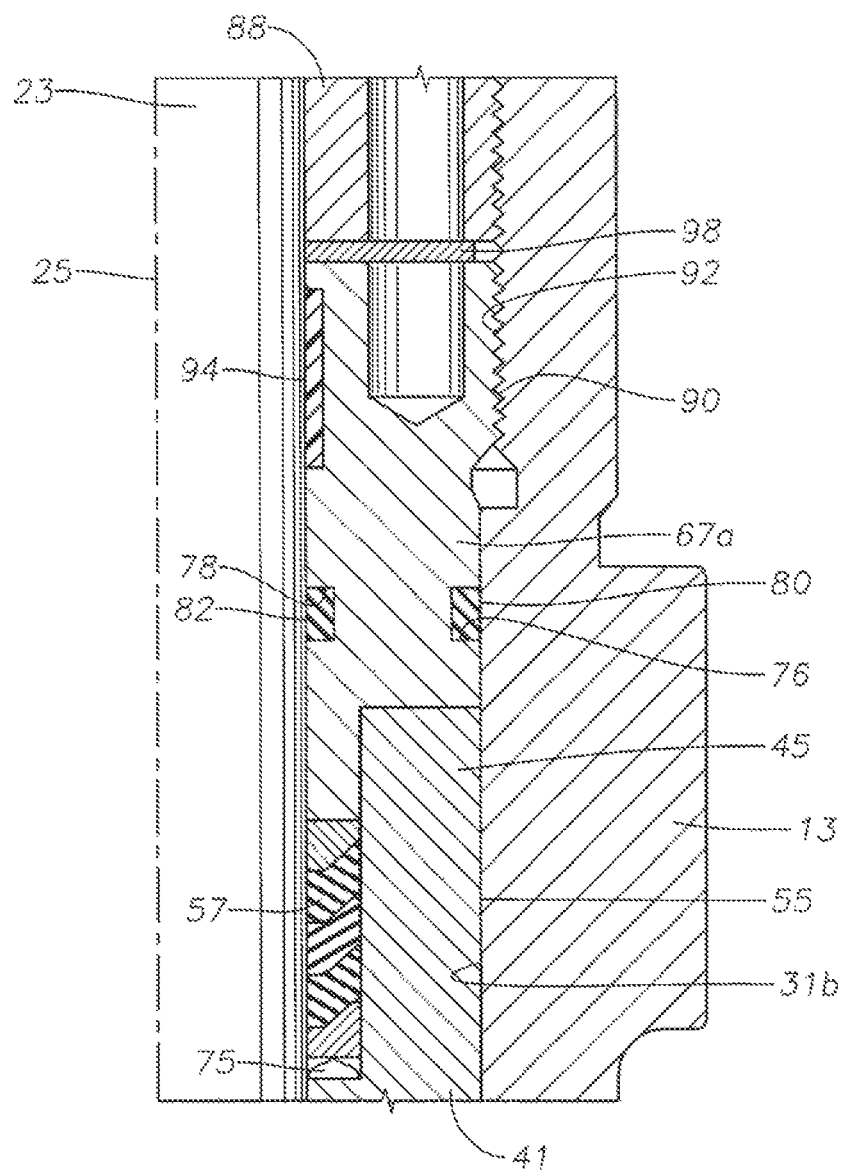
FIG. 3 is a detailed sectional view of a portion a packing assembly with a spring member in accordance with an alternative embodiment of the present disclosure.

In certain optional embodiments, such as shown in FIG. 3, a spring member 75 can be located within inner cavity 51. Spring member 75 can apply axial compressive force to the fire resistant stem packing 57. Spring member 75 can be, for example, a Belleville washer, or a wave spring or other type of spring known in the art. Spring member 75 can be located within inner cavity 51, either above or below fire safe stem packing 57. Spring member 75 is shown between shoulder 53 and an end of fire resistant stem packing 57. If during operation, wear on the fire resistant stem packing 57 causes the size of fire resistant stem packing 57 to be reduced, the downward protruding neck 68 may no longer apply sufficient axial compression on fire resistant stem packing 57 to provide a fluid seal during emergency fire conditions. In such a case, spring member 75 can provide the additional compressive forces required to maintain sufficient axial compression on fire resistant stem packing 57 to provide a fluid seal during emergency fire conditions.

In the alternative embodiment shown in FIG. 3, lower nut 86 is integrally combined with upper packing retainer 67 as a single member packing retainer 67a. In such an embodiment, external threads 90 are formed on an outer surface of an upper portion of the packing retainer 67a for mating with the internal threads 92 of bonnet 14 of valve body assembly 12. As the packing retainer 67a is screwed into bonnet 14, the downward protruding neck 68 of the upper packing retainer 67a axially compresses the fire resistant stem packing 57 and the downward facing retainer shoulder 70 pushes the lower packing retainer 41 downward (FIG. 2).

The terms "vertical", "horizontal", "upward", "downward", "above", and "below" and similar spatial relation terminology are used herein only for convenience because valve 11 may be installed in various positions, other than with the valve stem 23 pointing upward.

The present disclosure described herein, therefore, is well adapted to carry out the objects and attain the ends and advantages mentioned, as well as others inherent therein. White a presently preferred embodiment of the disclosure has been given for purposes of disclosure, numerous changes exist in the details of procedures for accomplishing the desired results. These and other similar modifications will readily suggest themselves to those skilled in the art, and are intended to be encompassed within the spirit of the present disclosure disclosed herein and the scope of the appended claims.

What is claimed is:

1. A valve having a packing assembly, the valve comprising:
   a valve body assembly defining a flow passage and a body cavity perpendicular to the flow passage, the valve body assembly further defining a bore extending from an exterior of the valve body assembly into the body cavity, the bore having an upper bore portion with an enlarged diameter defined by an inner surface of the bore;
   a valve member moveable between an open position and a closed position, the valve member blocking the flow passage in the closed position, and allowing flow through the flow passage in the open position;

a valve stem coupled to the valve member, the valve stem extending from the body cavity to an exterior of the valve body assembly through the bore for moving the valve member from the closed position to the open position, the valve stem having an axis;

a first stem packing circumscribing a first portion of the valve stem, and located in the upper bore portion;

a first packing retainer having a collar that limits axial movement of the first stem packing, and further having a first retainer body defining an inner cavity, and wherein the first stem packing floats separate from the first packing retainer so that the first stem packing is free of energization by the first packing retainer;

a second stem packing circumscribing a second portion of the valve stem, and located in the inner cavity of the first packing retainer;

a second packing retainer having a neck compressingly engaging the second stem packing, and further having a retainer shoulder engaging the first packing retainer; and a retaining assembly coupled with the valve body assembly for applying axial force to the second packing retainer.

2. The valve of claim 1, wherein the retaining assembly comprises:
a first nut coupled with the valve body assembly and in engagement with the second packing retainer;
a second nut coupled with the valve body assembly; and
at least one shim located between the first nut and the second nut to position the second nut a selected distance from the body cavity for limiting a down stroke of the valve stem.

3. The valve of claim 1, wherein:
the second packing retainer further comprises threads on an outer surface that engage threads on an inner surface of the bore of the valve body assembly, and
the retaining assembly comprises a second nut coupled with the valve body assembly.

4. The valve of claim 1, wherein:
the first packing retainer further comprises a tapered seal portion located adjacent to the collar, the tapered seal portion being radially deflectable and having a seal surface;
the valve body assembly comprises a mating seal surface so that the tapered seal portion deflects and forms a fluid seal between the first packing retainer and the valve body assembly when the first packing retainer is pushed to engage the seal surface of the first packing retainer with the mating seal surface of the valve body assembly.

5. The valve of claim 1, wherein the valve body assembly has a bonnet shoulder and the first stem packing is located between an end surface of the collar and the bonnet shoulder, a height of the first stem packing being less than a distance between the bonnet shoulder and the end surface of the collar defining a gap between an end of the first stem packing and one of the end surface of the collar and the bonnet shoulder, allowing limited axial movement of the first stem packing relative to the valve body assembly.

6. The valve of claim 1, wherein:
the second packing retainer comprises a first circumferential groove on an outer surface and a second circumferential groove on an inner surface; and
the valve further comprises:
a first sealing member located in the first circumferential groove to create a fluid seal between the outer surface of the second packing retainer and the valve body assembly; and a second sealing member located in the second circumferential groove to create a fluid seal between the inner surface of the second packing retainer and the valve stem.

7. The valve of claim 1, wherein the second stem packing comprises graphite.

8. A packing assembly for sealing an annular space between a valve stem with an axis and a valve body assembly, the packing assembly comprising:
a lower packing retainer having a collar with a lower end surface, and a lower retainer body defining an inner cavity with a bottom surface, the collar having a smaller outer diameter than the lower retainer body;
a fluid pressure energized lower stem packing, the lower stem packing located between the lower end surface of the collar of the lower packing retainer and the valve body assembly wherein a gap is defined between an end of the lower stem packing and one of the lower end surface of the collar and the valve body assembly so that the lower stem packing floats freely between the lower end surface of the collar and the valve body assembly;
an upper packing retainer with a downward protruding neck having a reduced outer diameter the upper packing retainer further comprising a downward facing retainer shoulder, the downward facing shoulder engaging an upper end of the lower packing retainer;
a fire resistant stem packing located in the inner cavity of the lower packing retainer, the ire resistant stem packing being compressed between the bottom surface of the inner cavity and the downward protruding neck of the upper packing retainer; and
a retaining assembly selectively coupled to the valve body assembly for applying axial force to the upper packing retainer.

9. The packing assembly of claim 8, wherein the retaining assembly comprises:
a lower nut in engagement with the second packing retainer;
at least one shim for adjusting the overall height of the packing assembly; and
an upper nut for retaining the at least one shim and limiting the stroke of the valve stem.

10. The packing assembly of claim 8, wherein the retaining assembly comprises a lower nut, the lower nut having a circumferential wear ring on an inner surface of the lower nut to selectively center the valve stem within the packing assembly.

11. the packing assembly of claim 8, wherein the lower packing retainer further comprises a radially deflectable tapered seal portion located adjacent to the collar, the tapered seal portion selectively creating a metal to metal seal between the lower packing retainer and the valve body assembly.

12. The packing assembly of claim 8, further comprising a spring member located within the inner cavity, the spring member applying axial compressive force on the fire resistant stem packing.

13. The packing assembly of claim 8, further comprising:
a first circumferential sealing member for selectively creating a fluid seal between an enter surface of the upper packing retainer and the valve body assembly; and
a second circumferential sealing member for selectively creating a fluid seal between an inner surface of the upper packing retainer and the valve stem.

14. A valve having a packing assembly, the valve comprising:
a valve body assembly defining a flow passage and a body cavity perpendicular to the flow passage, the valve body assembly further defining a bore extending from an exterior of the valve body assembly into the body cavity, the valve body assembly having an upward facing seal surface;

a valve member moveable between an open position and a closed position, the valve member blocking the flow passage in the closed position, and allowing a flow through the flow passage in the open position;

a valve stem coupled to the valve member, the valve stem having an axis and extending from the body cavity to an exterior of the valve body assembly through the bore for moving the valve member from the closed position to the open position;

an upper bore portion defined by an inner surface of the bore;

a floating lower stem packing circumscribing a first portion of the valve stem, and located in the upper bore portion;

a lower packing retainer having a collar that limits axial movement of the lower stem packing, wherein the lower stem packing floats separate from the lower packing retainer so that the lower stem packing is free of energization by the packing retainer, the lower packing retainer also having a lower retainer body defining an inner cavity, the lower packing retainer further comprising a tapered seal portion located adjacent to the collar, the tapered seal portion having a downward facing seal surface;

a compressed fire resistant stem packing circumscribing a second portion of the valve stem located in the inner cavity of the lower packing retainer;

an upper packing retainer with a downward protruding neck engaging the fire resistant stem packing, the upper packing retainer further comprising a downward facing retainer shoulder engaging the lower packing retainer; and a retaining assembly coupled with the valve body assembly for applying axial force to the upper packing retainer; and wherein the tapered seal portion of the lower packing retainer has a downward facing circumferential recess and deflects to form a fluid seal between the lower packing retainer and the valve body assembly when the lower packing retainer is pushed downward to engage the downward facing seal surface of the lower packing retainer with the upward facing seal surface of the valve body assembly.

15. The valve of claim 14, wherein the valve further comprises a valve actuator co-axially aligned with the valve stem, and the retaining assembly further comprises:

a lower nut coupled with the valve body assembly, the lower nut engaging the upper packing retainer;

an upper nut coupled with the valve body assembly; and at least one shim located between the lower nut and the upper nut, the at least one shim sized to limit the stroke of the valve actuator.

16. The valve of claim 14, wherein the lower stem packing comprises elastomeric materials and the fire resistant stem packing comprises graphite.

17. The valve of claim 14, wherein the valve body assembly has an upward facing bonnet shoulder and the lower stem packing floats between a lower end surface of the collar and the upward facing bonnet shoulder.

18. The valve of claim 14, wherein the inner cavity of the lower packing retainer has a bottom surface and the fire resistant stem packing is compressed between the bottom surface of the inner cavity and the downward protruding neck of the upper packing retainer.

19. The valve of claim 14, wherein the retaining assembly has a circumferential wear ring on an inner surface of the retaining assembly, the wear ring circumscribing a third portion of the valve stem to center the valve stem within the valve.

20. The valve of claim 14, further comprising:

a first circumferential sealing member creating a static fluid seal between the outer surface of the upper packing retainer and the bore; and a second circumferential sealing member creating a dynamic fluid seal between the inner surface of the upper packing retainer and the valve stem.

21. The valve of claim 1, wherein the lower packing retainer is free of mechanical connection with the bore such that the coupling of the retaining assembly to the valve body assembly both defines the axial force applied to the upper packing retainer and a height of the gap between an end of the first stem packing and one of the end surface of the collar and the bonnet shoulder.

22. The valve of claim 1, wherein all fluids leak path flow through the flow passage of the valve body assembly to escape out of the valve body assembly past the valve stem extend adjancet to the lower packing retainer, wherein the lower packing retainer further comprises a metal seal portion located adjacent to the collar, the metal seal portion engaging a seal surface of the valve body assembly to form a fire safe metal to metal seal between the lower packing retainer and the valve body assembly, and wherein the second stem packing is a fire safe seal between the lower packing retainer and the valve stem.

* * * * *